United States Patent
Niki et al.

(10) Patent No.: US 6,619,442 B2
(45) Date of Patent: Sep. 16, 2003

(54) AUTOMATIC STROKE ADJUSTMENT DEVICE FOR A BRAKE ACTUATOR

(75) Inventors: Hajime Niki, Chita (JP); Hiroyuki Terada, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/964,828

(22) Filed: Sep. 26, 2001

(65) Prior Publication Data

US 2002/0036125 A1 Mar. 28, 2002

(30) Foreign Application Priority Data

Sep. 28, 2000 (JP) .................................... 2000-297649

(51) Int. Cl.[7] .............................................. F16D 65/24
(52) U.S. Cl. ................. 188/79.51; 188/196 D; 188/79.52; 188/79.63
(58) Field of Search ................. 188/79.51, 79.63, 188/79.64, 79.62, 196 BA, 79.52, 196 D, 196 R, 196 V, 202, 364; 192/111 A; 92/13.6, 13.1

(56) References Cited

U.S. PATENT DOCUMENTS

| 4,852,702 A | 8/1989 | Kaneko ................. 188/196 D |
| 5,713,437 A | 2/1998 | Furukawa et al. ......... 188/352 |
| 6,367,367 B1 * | 4/2002 | Terada .................... 188/196 D |

* cited by examiner

*Primary Examiner*—Douglas C. Butler
(74) *Attorney, Agent, or Firm*—Seed IP Law Group PLLC

(57) ABSTRACT

An automatic stroke adjustment device for a brake actuator having clutch rings (240, 340, 440, 540, 546, 640) making an irreversible screw engagement relatively rotatable for the amount of exceeding the backlash by releasing the clutch engagement to rotate when exceeding the backlash of reversible screw engagement and maintaining the clutch engagement when in releasing the brake actuator while the brake actuator is in an active state to improve the processability, reduce the weight, and prevent overadjustment of the shoe clearance during the thermal expansion of the brake drum.

12 Claims, 15 Drawing Sheets

AUTOMATIC STROKE ADJUSTMENT DEVICE FOR A BRAKE ACTUATOR

BACKGROUND OF THE INVENTION

1. Field of the Invention

This invention relates to an automatic stroke adjustment device for a brake actuator.

2. Description of the Related Art

A brake actuator with an automatic stroke adjustment device at a cylinder bore opening is disclosed in U.S. Pat. No. 4,852,702 (Japanese provisional patent publication number 63-285341). FIG. 13 generally illustrates the automatic stroke adjustment device of the '702 patent.

The automatic stroke adjustment device of the '702 patent comprises a piston 21 slidably engaged with a cylinder bore 11a in a cylinder body 11 of a brake actuator 10; an adjustment nut 22 rotatably engaging a hollow in a top end of the piston 21 and abutting a stepped surface near the opening of the cylinder bore 11a; an adjustment bolt 30 having an externally threaded step 30a threadedly engaged with the internally threaded adjustment nut 22 so as to be non-rotatable with respect to the adjustment nut under an axial thrust, and having a bifurcated portion 30b at its top end holding a brake shoe 1 so as to restrict a rotation of the adjustment bolt 30; a clutch ring 40 having a clutching surface 40a making a clutch engagement with a clutching surface 11b at the opening side of the cylinder bore 11a, and having an internal thread 40b threadedly engaged with an external thread 22b on the adjustment nut 22 with an axial backlash between the two; and an adjustment spring 50 biasing the clutch ring 40 into engagement with the clutching surface 11b. Hereafter, "screw engagement threadedly engaged between the internal and external threads so as to be non-rotatable under an axial thrust" may be called "irreversible screw engagement," while "screw engagement threadedly engaged between the internal and external threads so as to be rotatable under an axial thrust" may be called "reversible screw engagement."

Automatic stroke adjustment function of the conventional device is explained next. If the stroke of the piston 21 during operation of the brake actuator 10 is within a predetermined range, the adjustment nut 22 and the adjustment bolt 30 advance with the piston 21 within the backlash between the clutch ring 40 and the adjustment nut 22 and the clutch ring remains in clutching engagement with the clutching surface 11b. If, for example, a lining on a brake shoe 1 (not shown in the figure) wears and the stroke of the piston 21 exceeds the predetermined range, the adjustment nut 22 moves with the piston beyond the backlash between the adjustment nut 22 and the clutch ring 40. As a result of the force exerted on the clutch ring by the adjustment nut, the clutch engagement between the clutching surface 40a of the clutch ring 40 and a clutching surface 11b of the cylinder body 11 is released. The clutching ring 40, under the force of the adjustment spring 50, then slides on the clutching surface 11b of the cylinder body 11 and rotates along the external thread 22b on the adjustment nut 22.

When, the operation of the brake actuator 10 is released and the piston 21 returns due to a spring force by the shoe return spring, the adjustment nut 22 and the adjustment bolt 30 backstroke with the piston 21 across the backlash between the adjustment nut 22 and the adjustment bolt 30 without rotation and the clutch ring 40 engages the clutching surface 11b of the cylinder body 11 due to the spring force by the adjustment spring 50, thereby restricting relative rotation between the clutch ring and the clutching surface.

As the piston 21 continues to backstroke, until the stepped surface of the adjustment nut 22 engages the supporting section of the stepped surface of the cylinder bore 11a to restrict its rotation, the adjustment nut 22 rotates along the internal thread 40b of the clutch ring 40 as it backstrokes with the piston 21. The rotation of the adjustment nut 22 with respect to the adjustment bolt 30 screws the adjustment bolt 30 outward to adjust the stroking amount of the brake actuator 10 in response to the brake lining wear.

A brake actuator with an automatic stroke adjustment device at a bottom portion of a cylinder bore is disclosed in U.S. Pat. No. 5,713,437 (Japanese provisional patent publication number 9-229115). Particular sections of the automatic stroke adjustment device of the '437 patent will be explained with reference to FIGS. 14 and 15.

This automatic stroke adjustment device for a brake actuator 110 comprises a piston 121 slidably engaged with a cylinder bore 11a in a cylinder body 111 of a brake actuator 110; an adjustment bolt 130 having an externally threaded stem 130c at one end making irreversible screw engagement with an internal thread 121c in a hollow 121b on the back side of the piston 121, and having a conical surface 130d at the other end making a clutch engagement with a first conical surface 111d formed on the partition wall 111c in the cylinder bore 111a; a clutch ring 140 having an internal thread 140b in reversible screw engagement with an external thread 130e formed on a large diameter axle portion of the adjustment bolt 130 with a backlash and a clutching surface 140a on the peripheral surface making a clutch engagement with a second conical surface 111e of the partition wall 111c; and an adjustment spring (drive ring spring) 150 biasing the clutch ring 140 to make a clutch engagement with the second conical surface.

A piston head 123 is restricted in its own rotation by holding and securing the brake shoe 1 in a bifurcated portion 123a formed at a top of the piston head 123, and the piston 121 is designed to be rotatable relative to the piston head 123 and the cylinder bore 111a.

Automatic stroke adjustment operation is explained next. If the stroke of the piston 121 during the operation of the brake actuator 110 is within a predetermined range, the adjustment bolt 130 advances with the piston 121 within the backlash between the clutch ring 140 and the adjustment bolt 130 and the clutch ring 140 remains in clutching engagement with the second conical surface 111e.

If a lining on a brake shoe 1 (not shown in the figure) wears and the stroke of the piston 121 exceeds the predetermined range, the adjustment bolt 130 moves beyond the backlash between the adjustment bolt 130 and the clutch ring 140. As a result, as the piston 121 continues to move the clutch engagement between the clutching surface 140a on the peripheral surface of the clutch ring 140 and the second conical surface 111e is released, and the clutch ring 140 under the force of the adjustment spring 150 slides on the second conical surface 111e of the partition wall 111c and rotates with respect to the adjustment bolt 130 along the external thread 130e on the adjustment bolt 130.

When, the operation of the brake actuator 110 is released and the piston 121 backstrokes to return due to a spring force by the shoe return spring, the piston 121 and the adjustment bolt 130 backstroke across the amount of backlash at the reversible screw engagement without the rotation of the piston 121 or the adjustment bolt 130, and the clutch ring 140 makes the clutch engagement with the second conical surface 111e of the partition wall 111c due to the spring force by the adjustment spring 150, thereby restricting the clutch ring's rotation.

As the piston 121 continues to backstroke, until the conical surface 130d of the adjustment bolt 130 engages with the first conical surface 111d on the partition wall 111c of the cylinder bore 111a to restrict its rotation, the adjustment bolt 130 rotates along the internal thread 140b of the clutch ring 140. In response to the rotation of the adjustment bolt 130, the piston 121 is screwed outward to adjust the stroking amount of the brake actuator 110 in compensation for the brake lining wear.

Both of the above types of clutch rings 40 and 140 have lead angle internal threads 40b, 140b on their inner circumferential surfaces and need strength to rotate objects making irreversible screw engagement with another member under the spring force of the shoe return spring. In order to attain the above object, the conventional clutch rings 40, 140 are made of relatively thick plates, manufactured such as by machining or a combination of forging and machining.

However, the above-described conventional automatic stroke adjustment device for a brake actuator has the following drawbacks.

If the clutch ring is manufactured from a thick metal plate by all machining or combination of forging and machining, this method not only increases the material cost and manufacturing cost but also increases a weight of the device. Also, in consideration of the processability of the clutch ring such as by machining and forging, if soft materials such as brass are employed, there is a possibility of causing friction with an abutting surface of the adjustment spring, which reduces the durability. In order to improve the durability, a hard thin metal plate may be put between the adjustment spring and the surface abutting the adjustment spring. However, this method not only increases the number of components but also increases the manpower required to manufacture and assemble the device. Accordingly, employing the relatively thick plate has disadvantage in its cost and weight.

Further, the clutch ring may be a monoblock made by a sintered metal. However, this method not only increases the cost but also complicates the structure of the die, which reduces the processability.

An automatic stroke adjustment device must maintain its operation even if the brake drum experiences thermal expansion because of a frequent use on a long downhill. When the drum expands at elevated temperatures, the device adjusts the stroke to compensate. When the brake drum returns to normal temperatures, a clearance between the brake drum and the brake shoe reduces as a result of thermal contraction of the brake drum. To compensate for this contraction, the clearance under the normal temperature needs to be preset larger than optimal, which necessarily sacrifices a brake operation stroke.

SUMMARY OF THE INVENTION

This invention is intended to remove the aforementioned drawbacks, and an object of this invention is to provide an automatic stroke adjustment device for a brake actuator with an excellent improved processability and a reduced weight. Further, another object of this invention is to provide an automatic stroke adjustment device for a brake actuator enabling one to stop the adjustment operation under high temperatures and to set a small shoe clearance under normal temperatures, thereby reducing the brake operation stroke.

The present invention is directed toward an automatic stroke adjustment device for a brake actuator, comprising a piston slidably fitting in a cylinder bore of a brake cylinder, a first screw engagement mechanism including a clutch ring and a first responsive member and allowing a relative rotation of the two due to an axial thrust, and a second screw engagement mechanism including the first responsive member and a second responsive member and inhabiting a relative rotation of the two under the axial thrust, in which if the piston overstrokes, a movement of the clutch ring of the first screw engagement mechanism exceeds a predetermined axial backlash between a female screw of the clutch ring and a male screw of the first responsive member, and a clutch engagement between the clutch ring and a third responsive member is released to allow a rotation of the clutch ring; if the overstroked piston then makes a backstroke, when the backlash is filled up, the clutch engagement between the clutch ring and the third responsive member is activated making the two non-rotatable, and the first responsive member, making a screw engagement with the clutch ring, rotates and the second responsive member, making a screw engagement with the first responsive member, screws out until the first responsive member engages with a supporting member making the first responsive member non-rotatable, wherein the clutch ring is a monoblock ring formed by pressing a thin plate.

Another embodiment of the present invention is directed toward an automatic stroke adjustment device for a brake actuator according to the first embodiment, wherein the first responsive member is an adjustment nut relatively rotatably fitting with the hollow at a top side of the piston and engaging with the supporting member at an opening side of the cylinder bore, the second responsive member is an adjustment bolt making a screw engagement with the female screw at an axis of the adjustment nut while the relative rotation therebetween due to an axial thrust is inhibited and the rotation is inhibited by a rotation regulator, a clutch ring makes a screw engagement with a male screw on a peripheral surface of the adjustment nut with an axial backlash therebetween while the relative rotation therebetween due to an axial thrust is allowed and makes the clutch engagement with the supporting member at the opening side of the cylinder bore, and an adjustment spring energizes the clutch ring in a direction to make a clutch engagement with the supporting member.

Yet another embodiment of the present invention is directed toward an automatic stroke adjustment device for a brake actuator, wherein the first responsive member is the piston, the second responsive member is an adjustment bolt making a screw engagement with the female screw at an axis of the piston, while the relative rotation therebetween due to an axial thrust is inhibited and the rotation is inhibited by a rotation regulator, a clutch ring makes a screw engagement with a male screw on a peripheral surface at a tip end of the piston with an axial backlash therebetween while the relative rotation therebetween due to an axial thrust is allowed and makes the clutch engagement with the supporting member at the opening side of the cylinder bore, and an adjustment spring energizes the clutch ring in a direction to make a clutch engagement with the supporting member.

Still another embodiment of the present invention is directed toward an automatic stroke adjustment device for a brake actuator, wherein the second responsive member is the piston being inhabited the rotation by a rotation regulator, the first responsive member is an adjustment bolt, one end of which has a male screw stem making a screw engagement with a female screw axially formed at a back end side of the piston while the relative rotation between the two due to an axial thrust is inhibited, and the other end of which makes a clutch engagement with a bottom of the cylinder bore, a clutch ring makes a screw engagement with a male screw formed adjacent to a clutch section of the adjustment bolt with an axial backlash therebetween while the relative rotation therebetween due to an axial thrust is allowed and makes a clutch engagement with the bottom of the cylinder bore; and an adjustment spring energizes the clutch ring in the direction to make a clutch engagement with the bottom of the cylinder bore.

One particular embodiment of the present invention is directed toward a brake cylinder, wherein the clutch ring is made of a thermoreacting material which releases the clutch engagement of the clutch ring when it reaches a predetermined temperature in order to stop an automatic adjustment operation.

According to embodiments of the present invention, a thin plate may be pressed to form the clutch ring, which reduces the cost of material and machining. An economic advantage increases with the mass production of the automatic stroke adjustment device. Further, the thin plate clutch ring improves the weight saving and the resources saving, thereby providing an excellent environmental advantage. In addition, a surface area of the clutching section of the clutch ring and a pith and a torsion angle (corresponding to a lead angle of the reversible thread) of plate teeth may easily be formed as desired regardless of the thickness of the thin plate, thereby increasing the degree of freedom in a layout of the automatic stroke adjustment device.

Embodiments of this invention is applicable to a brake actuator in which the automatic stroke adjustment device is to be installed at an opening in a cylinder bore of a hydraulic operating means or mechanical operating means, thereby providing a great applicability.

Embodiments of this invention is applicable to a brake actuator in which the automatic stroke adjustment device is to be installed at the bottom side of the cylinder bore.

In addition, an automatic adjusting member can simply be a thermo deformable material such as a bimetal and a shape memory alloy so that the clutch engagement of the clutch ring may be released when the brake temperature reaches the predetermined degree, thereby eliminating an occasion for damaging the automatic stroke adjustment function. For example, over adjustment of the shoe clearance when the brake drum is expanded due to the heat may be prevented, and an operation stroke of the brake actuator under the normal temperature may be reduced.

BRIEF DESCRIPTION OF THE SEVERAL VIEWS OF THE DRAWING(S)

The above and other objects and the attendant advantages of the present invention will readily become apparent with reference to the following detailed description when considered in conjunction with the accompanying drawings, wherein.

DETAILED DESCRIPTION OF THE INVENTION

The present detailed description is generally directed toward automatic stroke adjustment devices for brake actuators. Several embodiments of the invention allow a brake actuator to automatically adjust as the brake lining wears. Many specific details of certain embodiments of the invention are set forth in the following description and in FIGS. 1–12 to provide a thorough understanding of such embodiments. One skilled in the art, however, will understand that the present invention may have additional embodiments, or may be practiced without several of the details described in the following description.

Figure 13:
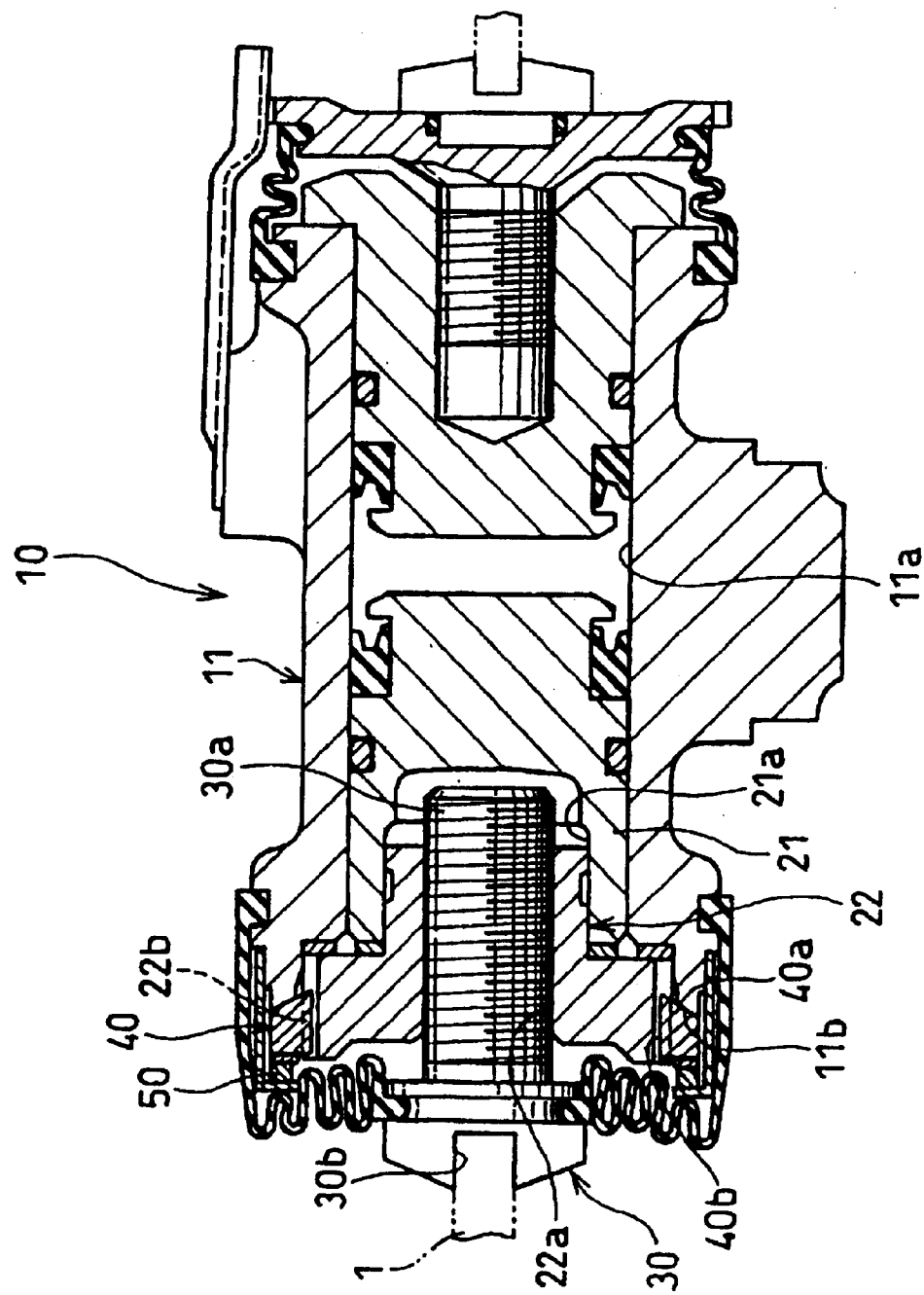
FIG. 13 is a cross-sectional view of a brake actuator having the automatic stroke adjustment device in the cylinder bore opening according to the prior art.

FIGS. 1–5 illustrate a brake actuator 210 having one particular embodiment of an automatic stroke adjustment device in a cylinder bore opening. Except for a clutch ring 240 and an adjustment spring 250, the structure of this embodiment of the invention is almost identical to that illustrated and described in connection with FIG. 13. Therefore, the following explanation is mainly made as to the clutch ring 240 and the adjustment spring 250 to avoid redundancy.

Figure 1:
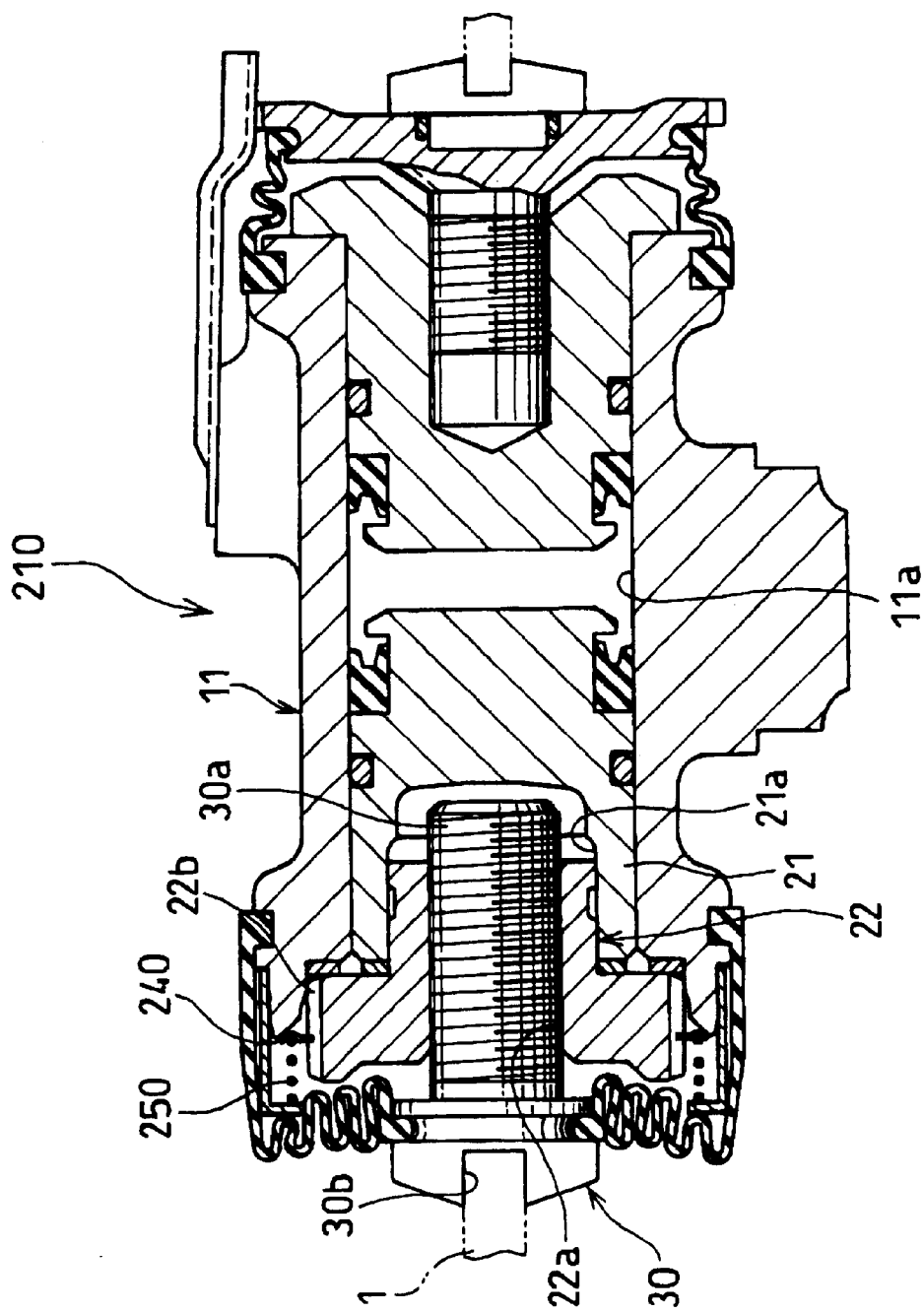
FIG. 1 is a diametric cross-sectional view of a brake actuator having an automatic stroke adjustment device in the cylinder bore opening according to one embodiment of the present invention.
Figure 2:
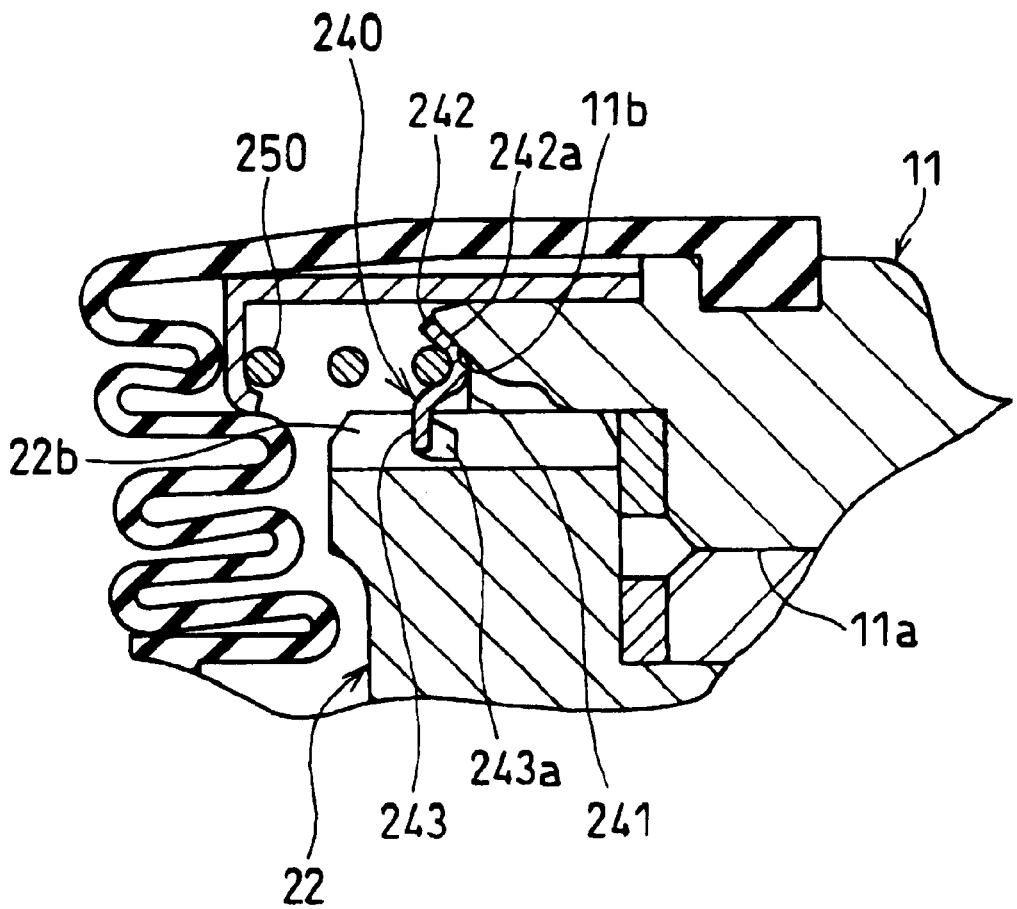
FIG. 2 is an enlarged view of a portion of the automatic stroke adjustment device of FIG. 1.
Figure 3:
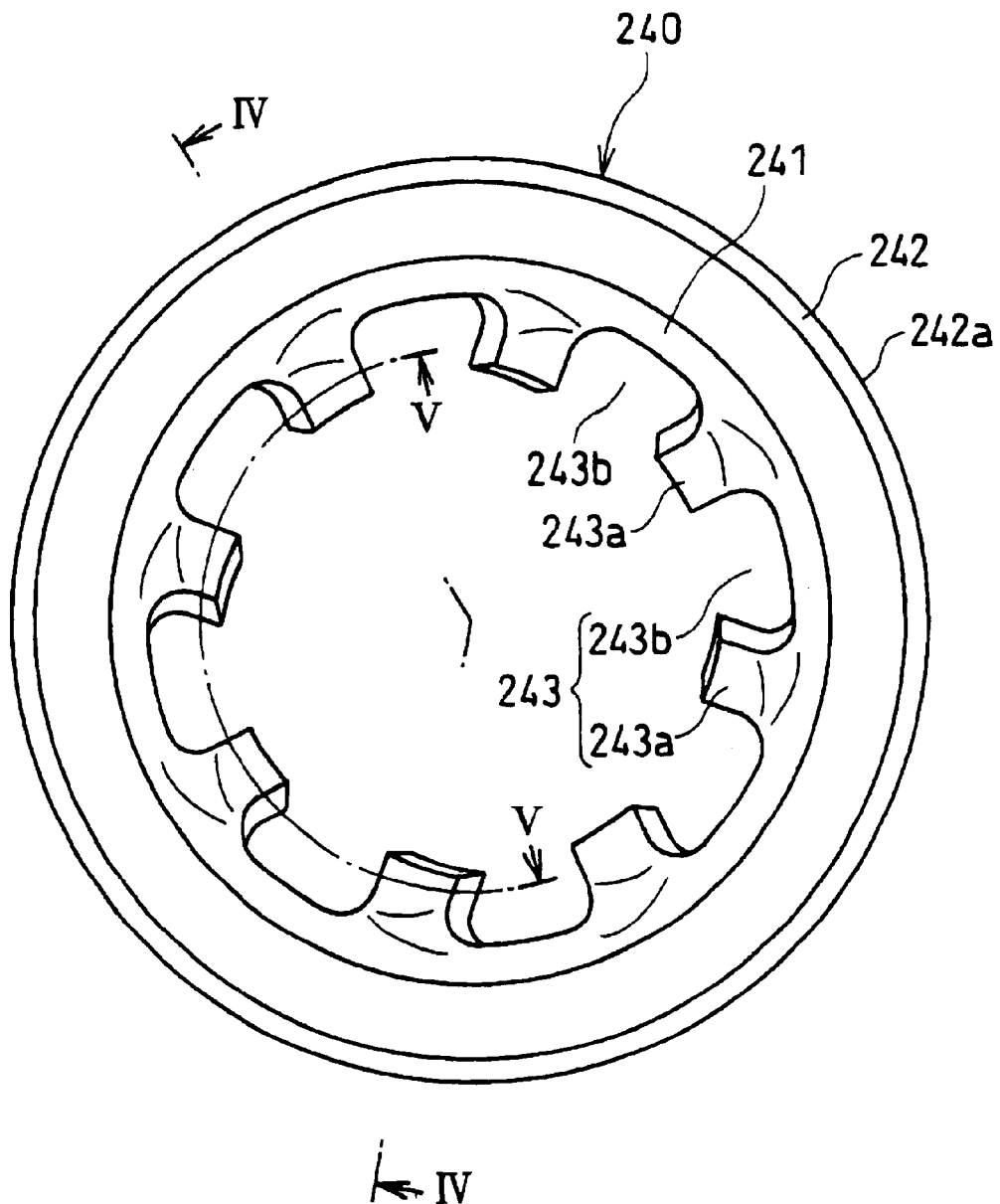
FIG. 3 is a plan view of a clutch ring from the automatic stroke adjustment device of FIG. 1.

According to this embodiment of the invention, best illustrated in FIGS. 2 and 3, the clutch ring 240 is a monoblock made by pressing a thin metal plate, e.g., a thin steel plate, and comprises a disc ring body 241, a clutching section 242 extending from a peripheral portion of the ring body 241, and a toothed portion 243 composed of a plurality of plate teeth 243a spaced apart at predetermined intervals and projecting into a central opening of the ring body 241. However, the ring body 241 is not a prerequisite of this invention and may be omitted if the clutching section 242 and the toothed portion 243 are designed to be continuous. The toothed portion 243 serves the same function as the internal thread 40b of the clutch ring 40 in the conventional art illustrated in FIG. 13, wherein each root section 243b (FIG. 3) as a thread groove is positioned between a plate tooth 243a and a neighboring plate tooth 243a. The number of plate teeth 243a may be the same as the number of external threads 22b on the adjustment nut 22 of the conventional art or may be less, as long as it provides the required strength.

Figure 4:
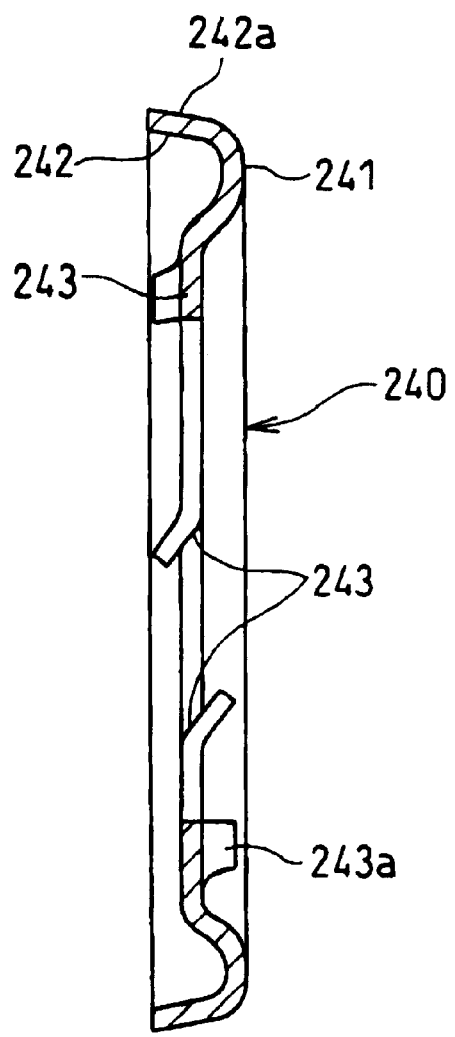
FIG. 4 is a cross-sectional view of the clutch ring of FIG. 3, viewed along Section IV—IV.

As best illustrated in FIG. 2, the pitch between each small plate tooth 243a extending from the ring body 241 into an axial center in view of a plane direction can be equal to a pitch between each external thread 22b of the adjustment nut 22, and the plate tooth 243a can be twisted to the same degree as the lead angle on the external thread 22b of the adjustment nut 22 (see FIG. 4). The clutch 242 can have a conical surface 242a corresponding with the clutching surface 11b in an opening of the cylinder bore 11a, and the conical surface 242a can be biased toward the direction to make a frictional clutch engagement by the coiled adjustment spring 250.

Figure 5:
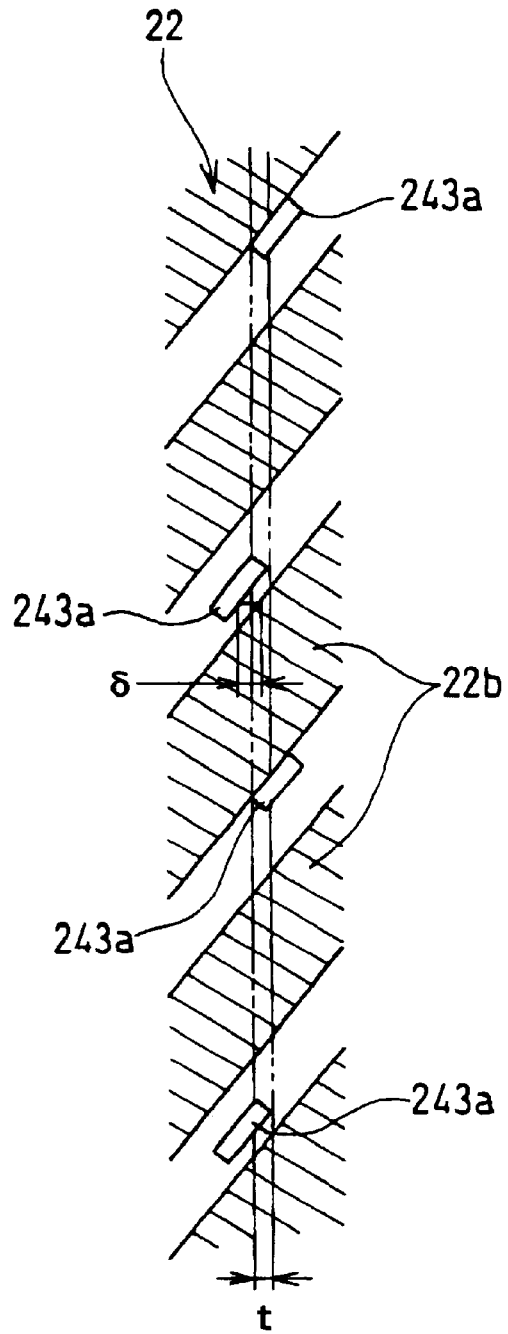
FIG. 5 is a development view schematically illustrating reversible screw engagement between the clutch ring and the adjustment nut of FIG. 1, viewed along Section V—V of FIG. 3.

FIG. 5 schematically shows a partial development view of the case when the clutch ring makes a screw engagement with the adjustment nut 22 while the brake actuator 21 (not shown) is in an inactive state. Two vertical broken lines in the drawing represent a plate surface of the thickness t of the ring body 241, and the diagonal lines represent the screw thread of the external thread 22b on the peripheral surface of the adjustment nut 22 while the unmarked portions represent thread grooves. Each plate tooth 243a is positioned within a thread groove of the external thread 22b on the peripheral surface of the adjustment nut 22, and adjacent plate teeth 243a are alternatively displaced toward the right and left relative to the plate surface of the ring body 241 shown in broken line. The plate tooth 243a is bent so that the distance between adjacent plate teeth 243a varies relative to the next distance between the adjacent plate teeth 243a (i.e., a side surface on the plate tooth 243a contacting the screw thread of the adjustment nut 22 varies relative to the next two side surfaces.

One of a pair of adjacent plate teeth 243a contacts the flank at one side of one external thread 22b, and the other of a pair of plate teeth 243a is spaced apart from and faces the flank on the opposite side of the one external thread 22b, with a gap δ between the latter two. In other words, looseness or play in an axial direction (left-right in the illustration) is a backlash of the reversible thread. A backlash may be, when the adjustment nut 22 advances (i.e., moves toward the left in FIG. 5), the distance of the movement of the external thread 22b which fills up the gap δ and reaches to abut against the plate tooth 243a bent toward the lower left side relative to the ring body 241, or when the adjustment nut 22 backstrokes from the above state (i.e., moves toward the right in FIG. 5), the distance of the movement of the plate tooth 243a bent toward the lower left side relative to the ring body 241 which fills up the gap δ and reaches to abut against the external thread 22b.

Instead of the above arrangement, all plate teeth 243a may be arranged in the same direction relative to the ring body 241. Especially as evident from FIG. 5, if each plate tooth 243a of the clutch ring 240 is configured to function as one screw thread, there is no need to thicken the plate thickness t even if the clutch ring 240 is a small size.

Accordingly, if a side surface of each plate tooth 243a of the toothed portion 243 is aligned to be parallel to the flank of the screw thread on the external thread 22b on the adjustment bolt 22, a larger contact surface of the reversible thread may be utilized even for a thin plate material, thereby providing a stable screw engagement when the reversible thread rotates either forward or backward.

Further, the torsion angle of each plate tooth 243a may freely be set, thereby facilitating the press working regardless of the size of the lead angle of the external thread 22b on the adjustment nut 22. In addition, by making an appropriate setting of the gap δ, the backlash can easily be changed.

In one example of a manufacturing method for the clutch ring 240, a two-step forming is conducted by blanking to snap a ring form to be the clutch ring 240 out from a coil material with a predetermined width and by drawing the clutching section 242 and bending all plate teeth 243a simultaneously. However, the manufacturing method and the number of process for the clutch ring 240 are not limited to what is described herein.

Figure 6:
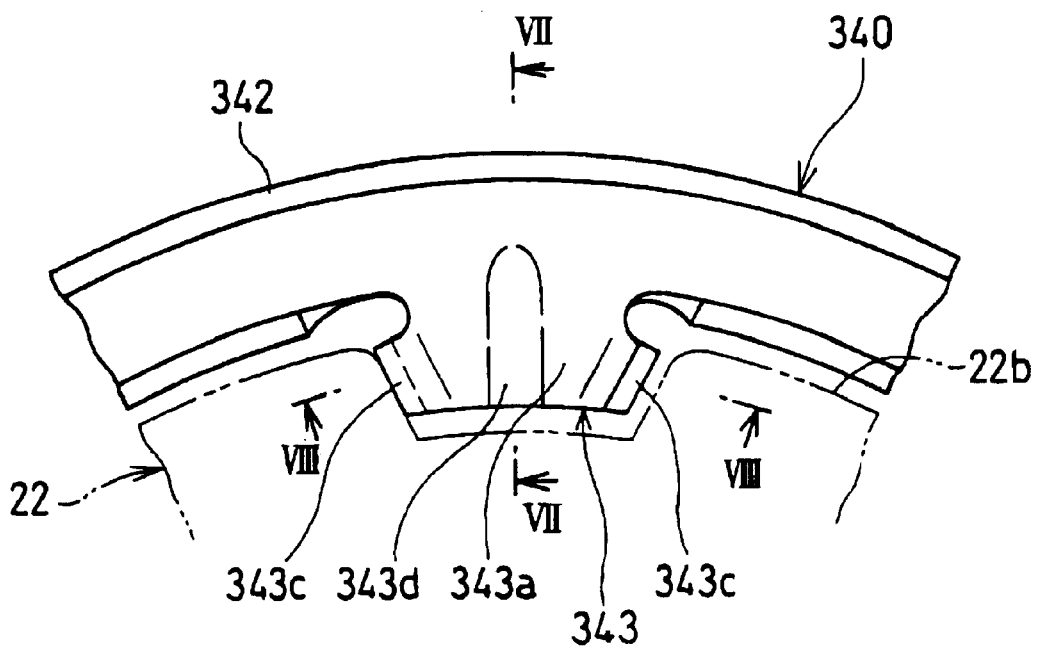
FIG. 6 is a plan view of a portion of a clutch ring according to another embodiment of the present invention.
Figure 7:
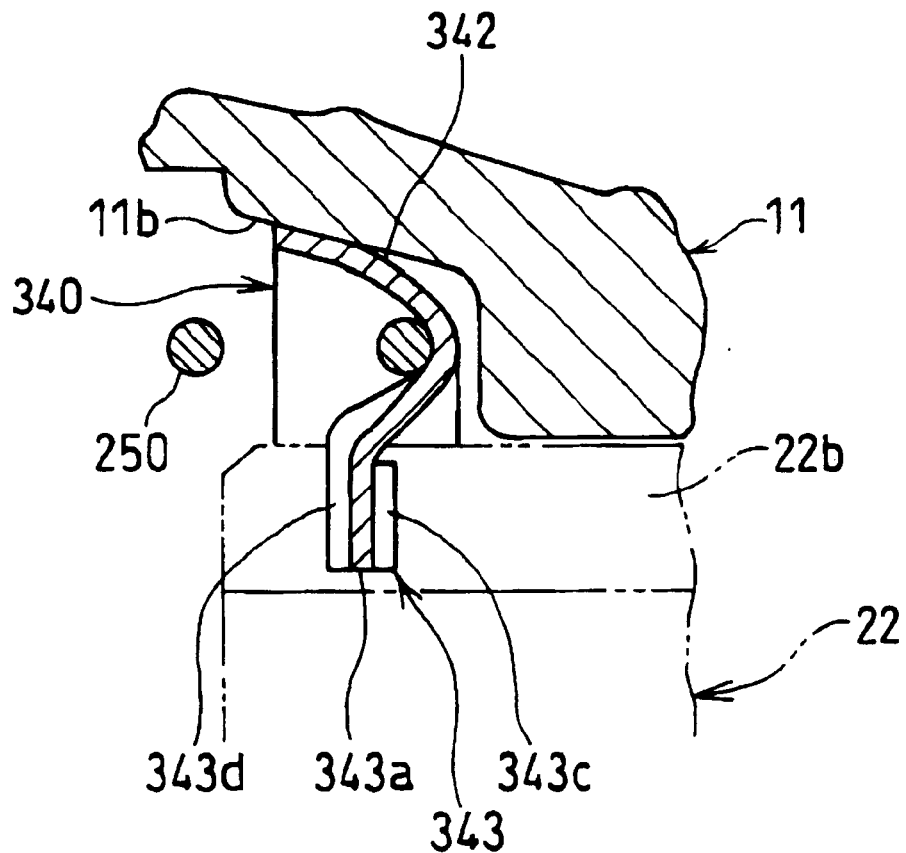
FIG. 7 is a cross-sectional elevation view of the clutch ring of FIG. 6 during use, viewed along Section VII—VII of FIG. 6.
Figure 8:
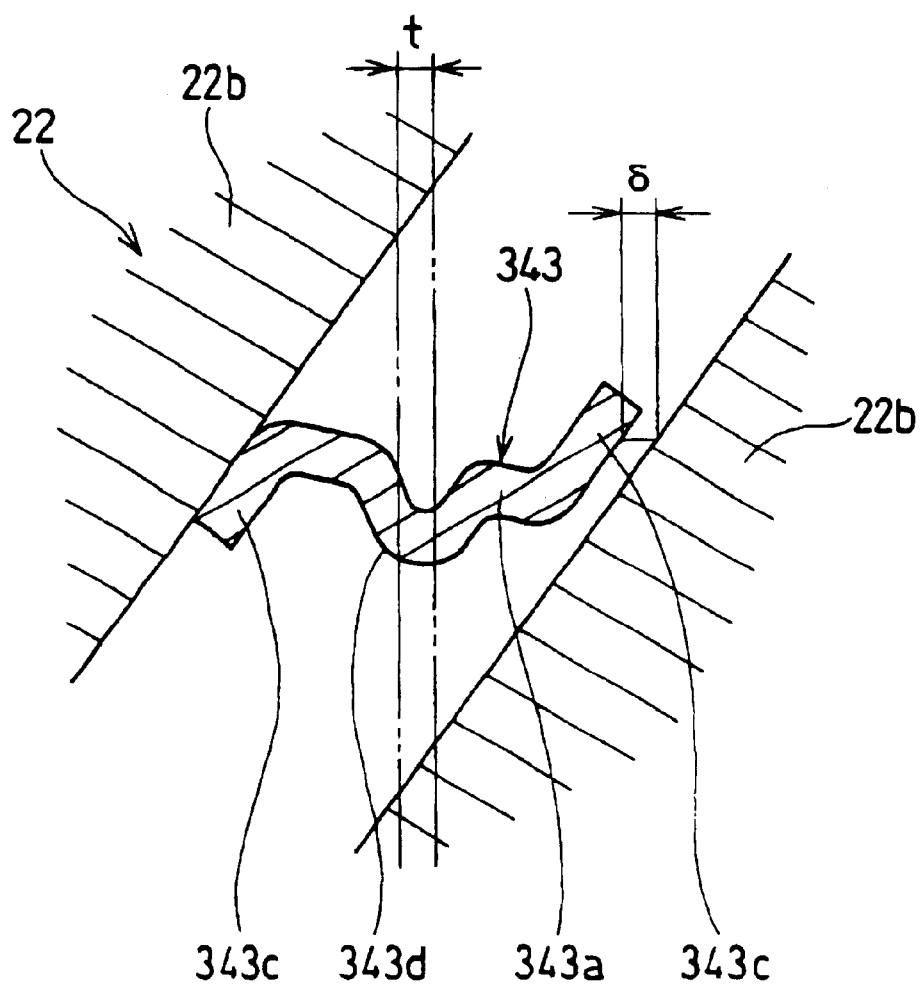
FIG. 8 is a development view schematically illustrating reversible screw engagement between the clutch ring of FIG. 6 and the adjustment nut, viewed along Section VIII—VIII of FIG. 6.

Another embodiment of this invention is explained next. For the explanation of this embodiment, identical members from the first embodiment have the same reference numbers, except for the clutch ring 340, and the explanation of identical members will be omitted here. FIGS. 6–8 show the clutch ring 340 with different shapes of plate teeth. The clutch ring 340 comprises a ring-shape clutch section 342 integrally formed from a thin metal plate material by press, and toothed portion 343 having plate teeth 343a projecting toward an axial center at predetermined intervals formed in a center opening of the clutch section 342.

Side surfaces 343c are located on both sides of the plate tooth 343a, and are formed in a direction to cross the thread groove. Both side surfaces 343c are bent in different directions relative to an axial direction and in an angle generally parallel to the flank of the screw thread on the external thread 22b. In this embodiment, FIG. 8 shows an engagement between one tooth 343 and the external thread 22b formed on a peripheral surface of the adjustment nut 22 during the inactive state of the brake actuator. The gap δ corresponds to the backlash of the reversible screw engagement section between both side surfaces 343c and the flank of the adjacent screw threads of the external thread 22b on the adjustment nut 22. In addition, if strengthening the plate tooth 343a is desirable, an angle stiffening rib 343d may be formed at a center of the plate tooth 343a.

Figure 9:
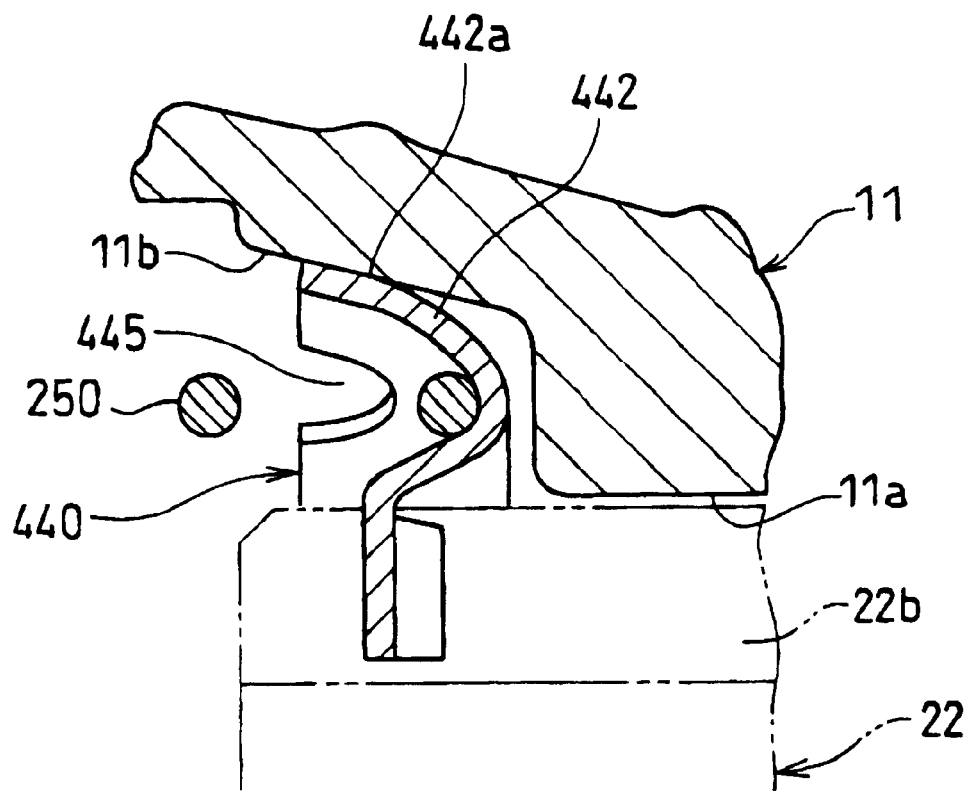
FIG. 9 is a partially enlarged cross-sectional view of an automatic stroke adjustment device according to yet another embodiment of the present invention.
Figure 10:
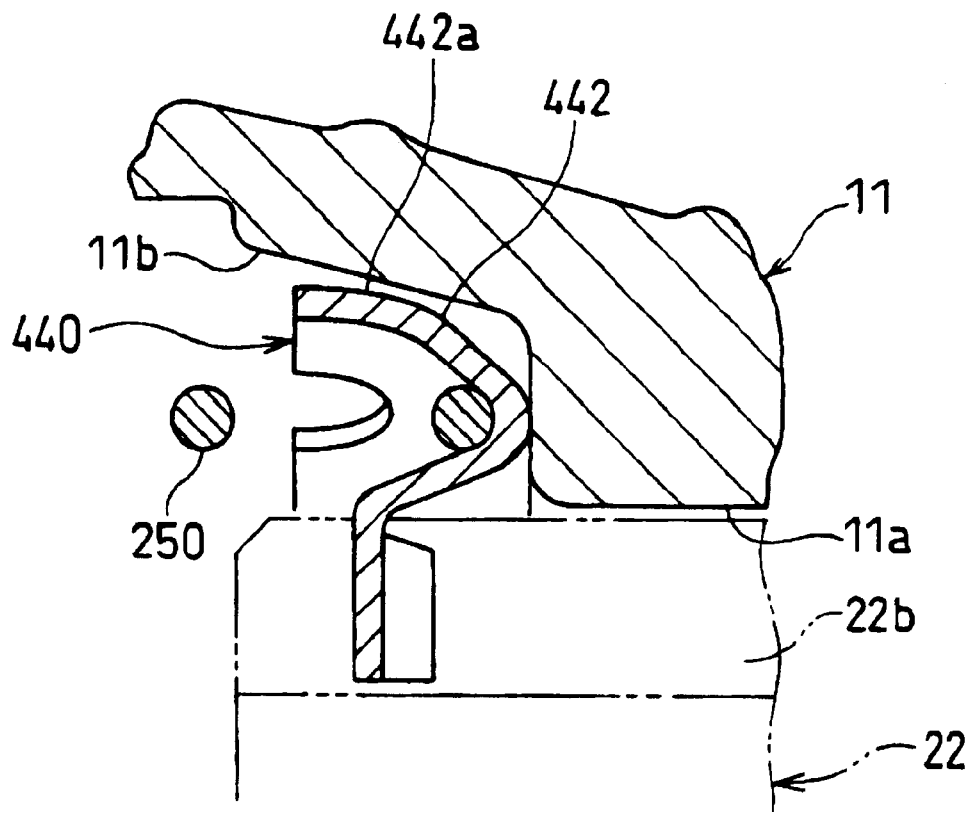
FIG. 10 is the portion of the device of FIG. 9 showing the condition when the clutch ring is thermally deformed.

FIGS. 9 and 10 show an automatic stroke adjustment device according to another embodiment of the present invention, having a mechanism to prevent over-adjustment of a shoe clearance while the brake drum is thermally expanded.

A shape of the clutch ring 440 is similar to those in the above-described embodiments, however, the clutch ring 440 is made of thermoreactive material deforming to reduce its diameter when reaching a predetermined temperature (under the temperature at which the brake drum expands). For the thermoreactive member, a bimetal, a shape memory alloy or other suitable materials may be used. In addition, if plural notched grooves 445 are formed on the clutching section 442 in a circumferential direction with predetermined intervals, the clutching section 442 tends to shrink inwardly easily and the deformation of the clutching section 442 is facilitated.

FIG. 9 shows a condition of the inventive device prior to the brake drum reaching the predetermined temperature where the conical surface 442a of the clutch ring 440 makes a clutch engagement with the clutching surface 11b of the cylinder body 11, thereby providing appropriate automatic adjustment similar to that described in connection with the above embodiments.

FIG. 10 shows a condition of the inventive device when the brake drum is at or above the predetermined temperature. As the drum temperature increases, if the temperature within the brake reaches the predetermined temperature, the clutching surface 442 of the clutch ring 440 deforms to reduce in diameter, and if the conical surface 442 is completely separated from the clutching surface 11b of the cylinder body 11, the bottom protruding peak of the clutching surface 442 makes a line contact with the stepped surface of the cylinder bore 11a. The clutch ring 40 upon releasing the brake has a small rotational frictional force with the stepped surface of the cylinder bore 11a, thereby rotating the clutch ring 40 without being able to rotate the adjustment nut 22. Therefore, automatic stroke adjustment operation does not function, which prevents over-adjustment of the shoe clearance and, as a result eliminates the need to set an operation stroke of the brake actuator larger than optimal under the normal temperature.

When the temperature reduces to return the brake drum to an initial diameter, the clutching surface 442 of the clutch ring 440 expands and again makes a clutch engagement with the clutching surface 11b.

Figure 11:
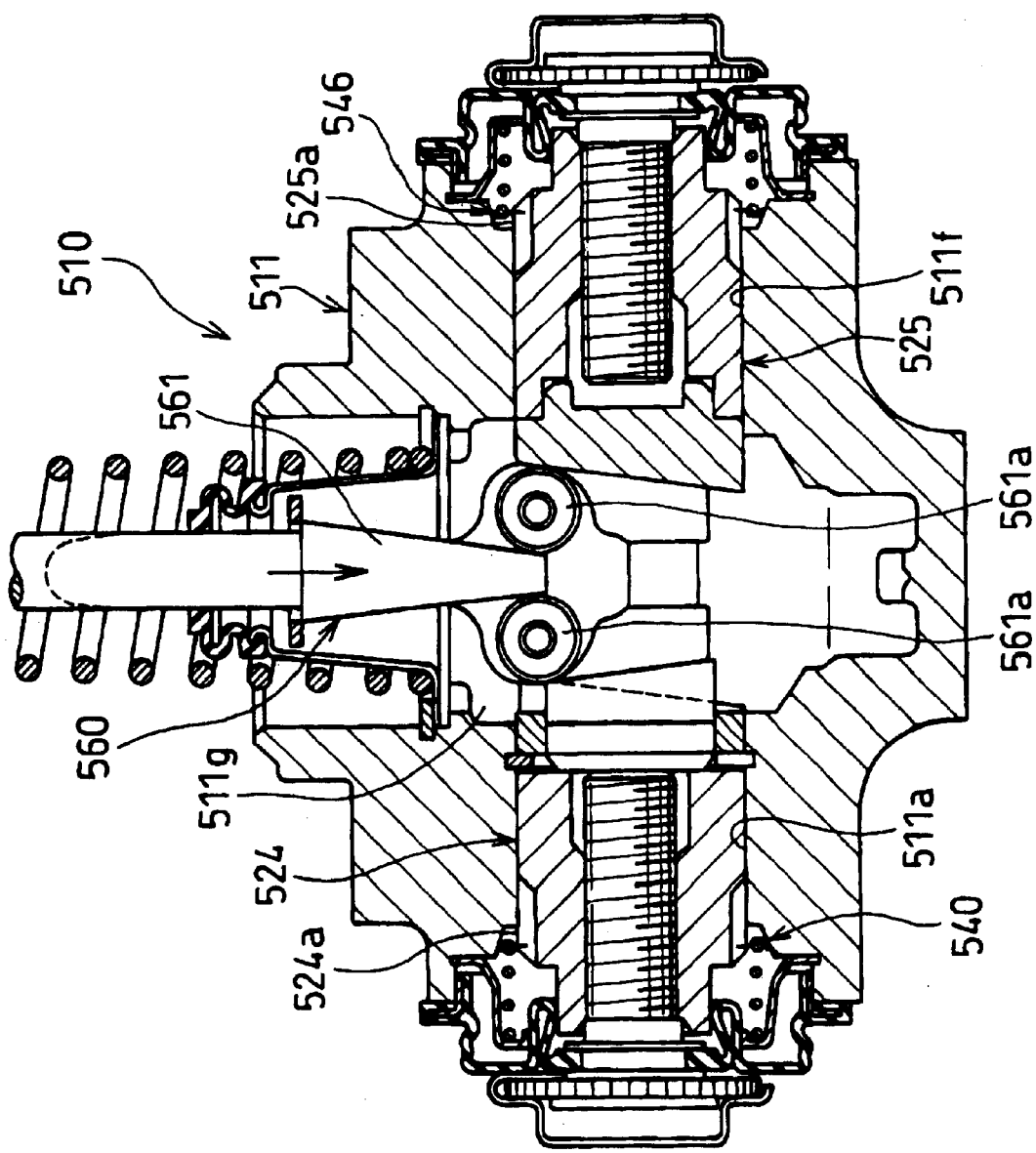
FIG. 11 is a cross-sectional view of a brake actuator according to still another embodiment of the present invention.

FIG. 11 shows one particular embodiment of a brake actuator with a mechanical operating means 560. The brake actuator 510 of this embodiment is explained in U.S. Pat. No. 4,887,697 and the explanation of which is limited to general information. Descriptions of the structure here are mainly made only as to other than what are described in '697 patent.

That is, the cylinder body 511 has a crossing hole 511g orthogonally aligned between the cylinder bores 511a and 511f rectilinearity communicating each other. Pistons 524, 525 rotatably slidably fit in the cylinder bores 511a, 511f, where the pistons 524, 525 advance to depart from each other via rollers 561a, 561a by operation of wedge section 561 in the intersection hole 511g.

Reversible external threads 524a, 525a are formed at the top side of the pistons 524, 525, and the clutch rings 540, 546 making a screw engagement with the external threads 524a, 525a with a backlash in the axial direction make clutch engagement with the clutching surface at the opening side of the cylinder bores 511a, 511f respectively. This structure utilizes a design concept of integrating the piston 21 and the adjustment nut 22 in the first embodiment of this invention above, having the same automatic stroke operation, the explanation of which will be omitted here.

It can be easily considered that the automatic stroke adjustment device of this invention for example may be applicable to a brake actuator configuring both mechanical and hydraulic type as disclosed in the U.S. Pat. No. 4,535,875.

The mechanical type of the brake actuator described in this embodiment is a pushing wedge type but may be applicable to a pulling wedge type as disclosed in the Japanese Utility Model Publication Number 2,590,929.

Figure 12:
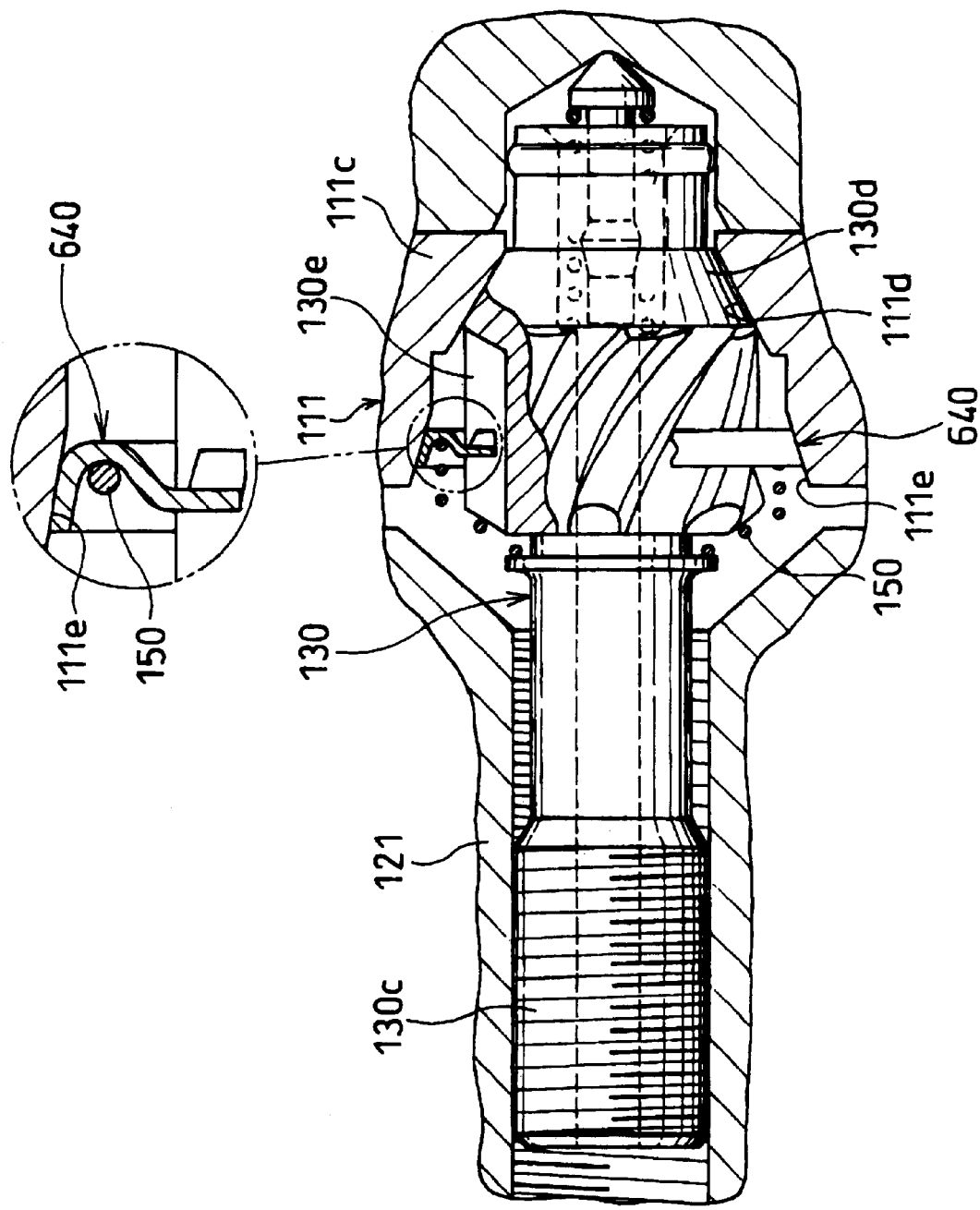
FIG. 12 is an enlarged view of a portion of a brake actuator having an automatic stroke adjustment device at the bottom side in the cylinder bore opening according to still another embodiment of the present invention.
Figure 14:
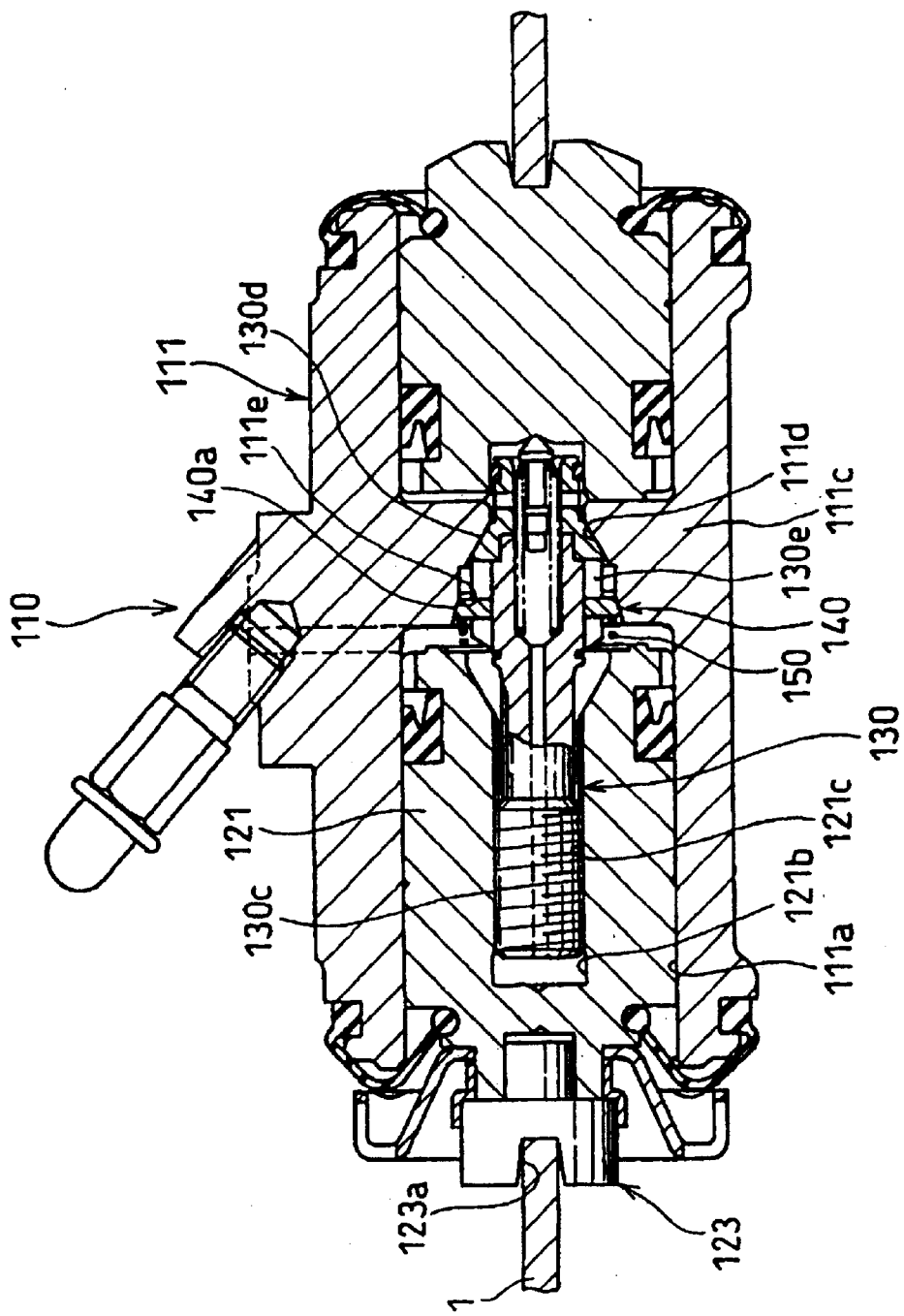
FIG. 14 is a cross-sectional view of a brake actuator having an automatic stroke adjustment device in the bottom of the cylinder bore opening according to the prior art.
Figure 15:
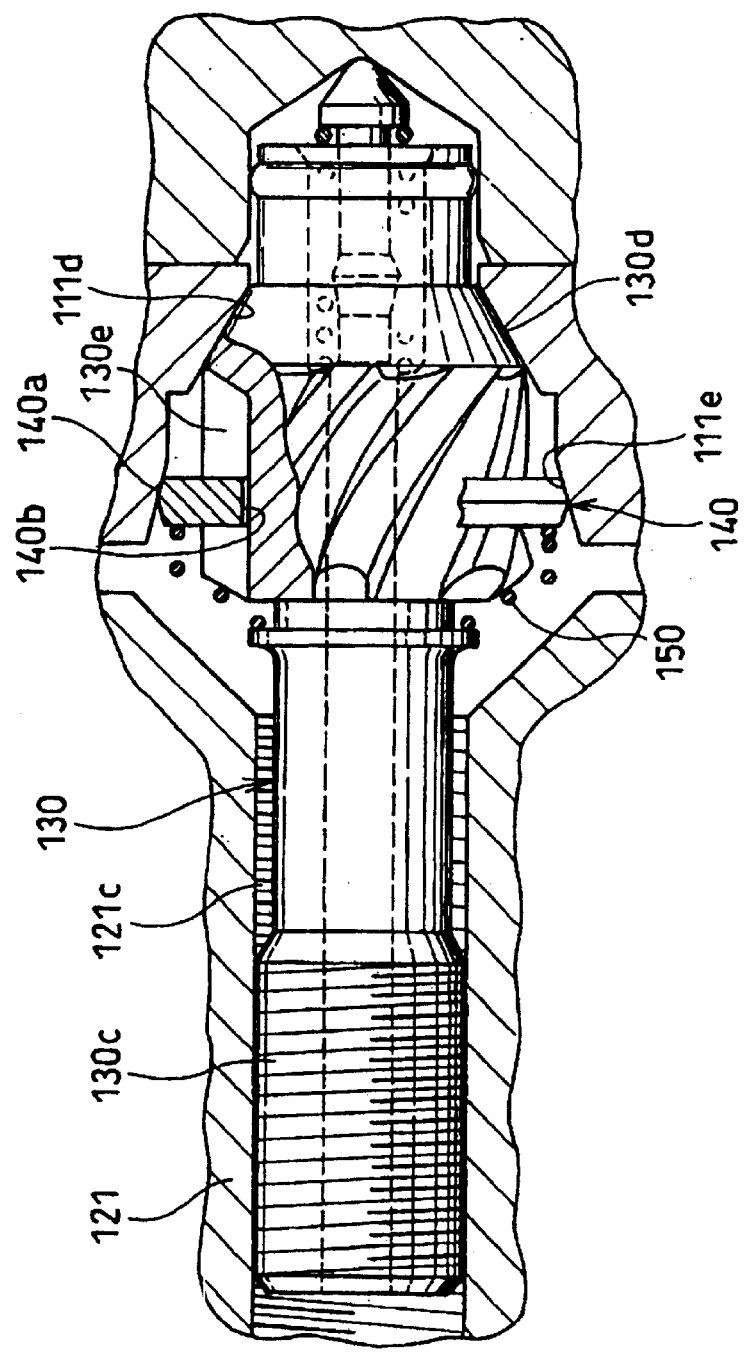
FIG. 15 is an enlarged view of a portion of the device of FIG. 14.

FIG. 12 shows another embodiment of an automatic stroke adjustment device with the clutch ring 640 at the bottom side of the cylinder bore in the cylinder body 111. A brake actuator in this embodiment of this invention is a device employing a design concept of one of the clutch rings 240, 340 or 440 in the first three embodiments above, applied in the brake actuator 110 of the conventional art illustrated in FIGS. 14 and 15. Therefore, the function of the brake actuator can be understood in light of the above detailed description, the explanation of which will be omitted here. The external thread 130e and the conical surface 130d of the adjustment bolt 130 may be reversed.

By selecting an appropriate brake actuator as above, this invention may be applicable to two-leading (2L) type, duo two-leading (D2L) type, leading trailing (LT) type, and duo servo (DS) type drum brake devices. Further, the type of actuator may be one-side opening or both side opening as long as it has an automatic stroke adjustment device with the clutch ring. Other than the brake actuator for a drum brake, it can be easily understood that this invention may be applicable to a brake actuator for a disc brake device.

Because of the above-described structure, this invention has the following advantages, among others:

Employing a thin plate clutch ring, a continuous press working may be utilized, which not only reduces the cost of material and processing but also reduces weight.

In addition to the above advantage, if the clutch ring is a thin steel plate, durability of the supporting surface on which the adjustment spring sits and the plate tooth is improved, and the shape of the plate tooth can be easily changes providing excellent designability.

This invention can be employed to various types of brake actuators, drum brakes, and disc brake, which provides a wide range of applicability.

If the clutch ring is made of a thermoreactive member annulling the clutch engagement of the clutching surface of the clutch ring when reaching the predetermined temperature, no additional part is necessary to accurately prevent the overadjustment of the shoe clearance during the brake drum thermal expansion, thereby allowing to set the operation stroke of the brake actuator small the under the normal temperature.

It is readily apparent that the above-described has the advantage of wide commercial utility. It should be understood that the specific form of the invention hereinabove described is intended to be representative only, as certain modifications within the scope of these teaching may be apparent to those skilled in the art.

Accordingly, reference should be made to the following claims in determining the full scope of the invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An automatic stroke adjustment device for a brake actuator, comprising:

a piston slidably fitting in a cylinder bore of a brake cylinder;

a first screw engagement mechanism comprising a clutch ring and a first responsive member, relative rotation of the two resulting from an axial thrust;

and a second screw engagement mechanism including the first responsive member and a second responsive member, relative rotation of the two not resulting from an axial thrust, in which if the piston overstrokes, a movement of the clutch ring of the first screw engagement mechanism exceeds a predetermined axial backlash between a female screw of the clutch ring and a male screw of the first responsive member, a clutch engagement between the clutch ring and a third responsive member is released to allow a rotation of the clutch ring; if the piston makes a back-stroke, when the backlash is exceeded, the clutch engagement between the clutch ring and the third responsive member is activated making the two non-rotatable, and the first responsive member, making a screw engagement with the clutch ring, rotates and the second responsive member, making a screw engagement with the first responsive member, screws out until the first responsive member engages with a supporting member making the first responsive member non-rotatable, wherein the clutch ring is in the form of a unitary ring.

2. An automatic stroke adjustment device for a brake actuator according to claim 1 wherein the first responsive member is an adjustment nut relatively rotatably fining with the hollow at a top side of the piston and engaging with the supporting member at an opening side of the cylinder bore, the second responsive member is an adjustment bolt making a screw engagement with the female screw at an axis of the adjustment nut while the relative rotation therebetween due to an axial thrust is inhibited and the rotation is inhibited by a rotation regulator, the clutch ring makes a screw engagement with a male screw on a peripheral surface of the adjustment nut with an axial backlash therebetween while the relative rotation therebetween due to an axial thrust is allowed and makes the clutch engagement with the supporting member at the opening side of the cylinder bore, and an adjustment spring energizes the clutch ring in a direction to make a clutch engagement with the supporting member.

3. An automatic stroke adjustment device for a brake actuator according to claim 1 wherein the first responsive member is the piston, the second responsive member is an adjustment bolt making a screw engagement with the female screw at an axis of the piston, while the relative rotation therebetween due to an axial thrust is inhibited and the rotation is inhibited by a rotation regulator, the clutch ring makes a screw engagement with a male screw on a peripheral surface at a tip end of the piston with an axial backlash therebetween while the relative rotation therebetween due to an axial thrust is allowed and makes the clutch engagement with the supporting member at the opening side of the cylinder bore, and an adjustment spring energizes the clutch ring in a direction to make a clutch engagement with the supporting member.

4. An automatic stroke adjustment device for a brake actuator according to claim 1 wherein the second responsive member is the piston being inhabited the rotation by a rotation regulator, the first responsive member is an adjustment bolt, one end of which has a male screw stem making a screw engagement with a female screw axially formed at a back end side of the piston while the relative rotation between the two due to an axial thrust is inhibited and the other end of which makes a clutch engagement with a bottom of the cylinder bore, the clutch ring makes a screw engagement with a male screw formed adjacent to a clutch section of the adjustment bolt with an axial backlash therebetween while the relative rotation therebetween due to an axial thrust is allowed and makes a clutch engagement with the bottom of the cylinder bore; and an adjustment spring energizes the clutch ring in the direction to make a clutch engagement with the bottom of the cylinder bore.

5. An automatic stroke adjustment device for a brake cylinder according to claim 1 wherein the clutch ring is made of a thermoreacting material which releases the clutch engagement of the clutch ring when it reaches a predetermined temperature in order to stop an automatic adjustment operation.

6. A system for automatically adjusting the stroke of a brake actuator, the system comprising:

a brake cylinder having a cylinder bore with a longitudinal axis;

a piston slidably engaged with the cylinder bore;

an engagement assembly coupleable between the piston and a brake shoe to operate the brake shoe in response to axial movement of the piston, the engagement assembly comprising a first member and a second member threadedly engaged with the first member such that relative rotation between the first and second members changes a longitudinal length of the engagement assembly and adjusts the stroke of the brake actuator; and a clutch member threadedly engaged with one of the first and second members such that relative axial movement between the clutch member and the one of the first and second members causes relative rotation about the longitudinal axis between the clutch member and the one of the first and second members whereby the clutch member can be activated to adjust the stroke of the brake actuator, the clutch member being configured to distort at or above a predetermined maximum temperature to deactivate the clutch member when a system temperature reaches or exceeds the maximum temperature whereby the stroke of the brake shoe will not be adversely adjusted when the system is overheated.

7. The system of claim 6 wherein the clutch member is slidably engaged with the brake cylinder and is movable along the longitudinal axis with respect to the brake cylinder between an adjustment position in which the clutch member is rotatable about the longitudinal axis with respect to the brake cylinder and the clutch member can adjust the engagement assembly, and a passive position in which the clutch member is restricted from rotating about the longitudinal axis with respect to the brake cylinder and the clutch member cannot adjust the engagement assembly.

8. The system of claim 6 wherein the threaded engagement between the clutch member and the one of the first and second members has a predetermined measure of backlash in the direction of the longitudinal axis to allow a corresponding predetermined amount of axial movement between the clutch member and the one of the first and second members.

9. The system of claim 6 wherein the clutch member is slidably engaged with the brake cylinder and is movable along the longitudinal axis with respect to the brake cylinder between an adjustment position in which the clutch member is rotatable about the longitudinal axis with respect to the brake cylinder and the clutch member can adjust the engagement assembly, and a passive position in which the clutch member is restricted from rotating about the longitudinal axis with respect to the brake cylinder and the clutch member cannot adjust the engagement assembly, and wherein the piston is configured to move the clutch member between the adjustment position and the passive position.

10. The system of claim 6 wherein the clutch member is slidably engaged with the brake cylinder and is movable along the longitudinal axis with respect to the brake cylinder between an adjustment position in which the clutch member is rotatable about the longitudinal axis with respect to the brake cylinder and the clutch member can adjust the engagement assembly, and a passive position in which the clutch member is restricted from rotating about the longitudinal axis with respect to the brake cylinder and the clutch member cannot adjust the engagement assembly, the threaded engagement between the clutch member and the one of the first and second members has a predetermined measure of backlash in the direction of the longitudinal axis to allow a corresponding predetermined amount of free axial movement between the clutch member and the one of the first and second members, and wherein the piston is configured to move the clutch member between the adjustment position and the passive position when the stroke of the piston exceeds the predetermined measure of backlash.

11. The system of claim 6 wherein the clutch member is slidably engaged with the brake cylinder and is movable along the longitudinal axis with respect to the brake cylinder between an adjustment position in which the clutch member is rotatable about the longitudinal axis with respect to the brake cylinder and the clutch member can adjust the engagement assembly, and a passive position in which the clutch member is restricted from rotating about the longitudinal axis with respect to the brake cylinder and the clutch member cannot adjust the engagement assembly, the threaded engagement between the clutch member and the one of the first and second members has a predetermined measure of backlash in the direction of the longitudinal axis to allow a corresponding predetermined amount of free axial movement between the clutch member and the one of the first and second members, and wherein the piston is configured to move the clutch member between the adjustment position and the passive position when the stroke of the piston exceeds the predetermined measure of backlash corresponding to excessive wear in the brake shoe, whereby excessive wear of the brake shoe results in automatic adjustment of the stroke of the brake actuator.

12. A clutch member for use in a system for automatically adjusting the stroke of a brake actuator, the system incorporating a piston slidably engaged within a cylinder bore in a brake cylinder to move along a longitudinal axis, and an engagement assembly coupleable between the piston and a brake shoe to operate the brake shoe in response to axial movement of the piston, the engagement assembly having a first member and a second member threadedly engaged with the first member such that relative rotation between the first and second members changes a longitudinal length of the engagement assembly and adjusts the stroke of the brake actuator, the clutch member comprising:

a body being at least temporarily fixable against rotation about the longitudinal axis within the brake cylinder whereby the clutch member can be activated, and being threadedly engageable with one of the first and second members such that axial movement of the one of the first and second members with respect to the clutch member when the clutch member is activated causes rotation of the one of the first and second members about the longitudinal axis with respect to the other of the first and second members and causes adjustment of the stroke of the brake actuator, the body being configured to distort at or above a predetermined maximum temperature to deactivate the clutch member when a system temperature reaches or exceeds the maximum temperature whereby the stroke of the brake shoe will not be adversely adjusted when the system is overheated.

* * * * *

UNITED STATES PATENT AND TRADEMARK OFFICE
CERTIFICATE OF CORRECTION

PATENT NO. : 6,619,442 B2
DATED : September 16, 2003
INVENTOR(S) : Hajime Niki et al.

It is certified that error appears in the above-identified patent and that said Letters Patent is hereby corrected as shown below:

Column 3,
Lines 37 and 38, "the clutch ring may be a monoblock made by a sintered metal" should read -- the clutch ring may be made of a sintered alloy --.
Line 66, "including" should read -- comprising --.

Column 4,
Line 1, "due to" should read -- resulting from --.
Line 3, delete the word "inhabiting".
Line 4, "under the" should read -- not resulting from an --.
Line 11, delete "overstroked" and "then".
Line 12, "filled up" should read -- exceeded --.
Lines 20 and 21, "wherein the clutch ring is a monoblock ring formed by pressing a thin plate." should read -- wherein the clutch ring is in the form of a unitary ring. --.
Lines 32, 48 and 65, "a" should read -- the --.

Column 6,
Lines 56 and 57, "the clutch ring 240 is a monoblock" should read -- the clutch ring 240 is in the form of a unitary ring --.

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,619,442 B2
DATED : September 16, 2003
INVENTOR(S) : Hajime Niki and Hiroyuki Terada It is certified that error appears in the above-identified patent and that said Letters Patent is hereby corrected as shown below:

Column 11,
Line 11, "fining" should read as -- fitting --.

Signed and Sealed this

Fifteenth Day of June, 2004

JON W. DUDAS
*Acting Director of the United States Patent and Trademark Office*